(No Model.)
J. W. KENNA.
TILTING CHAIR.
No. 252,225. Patented Jan. 10, 1882.
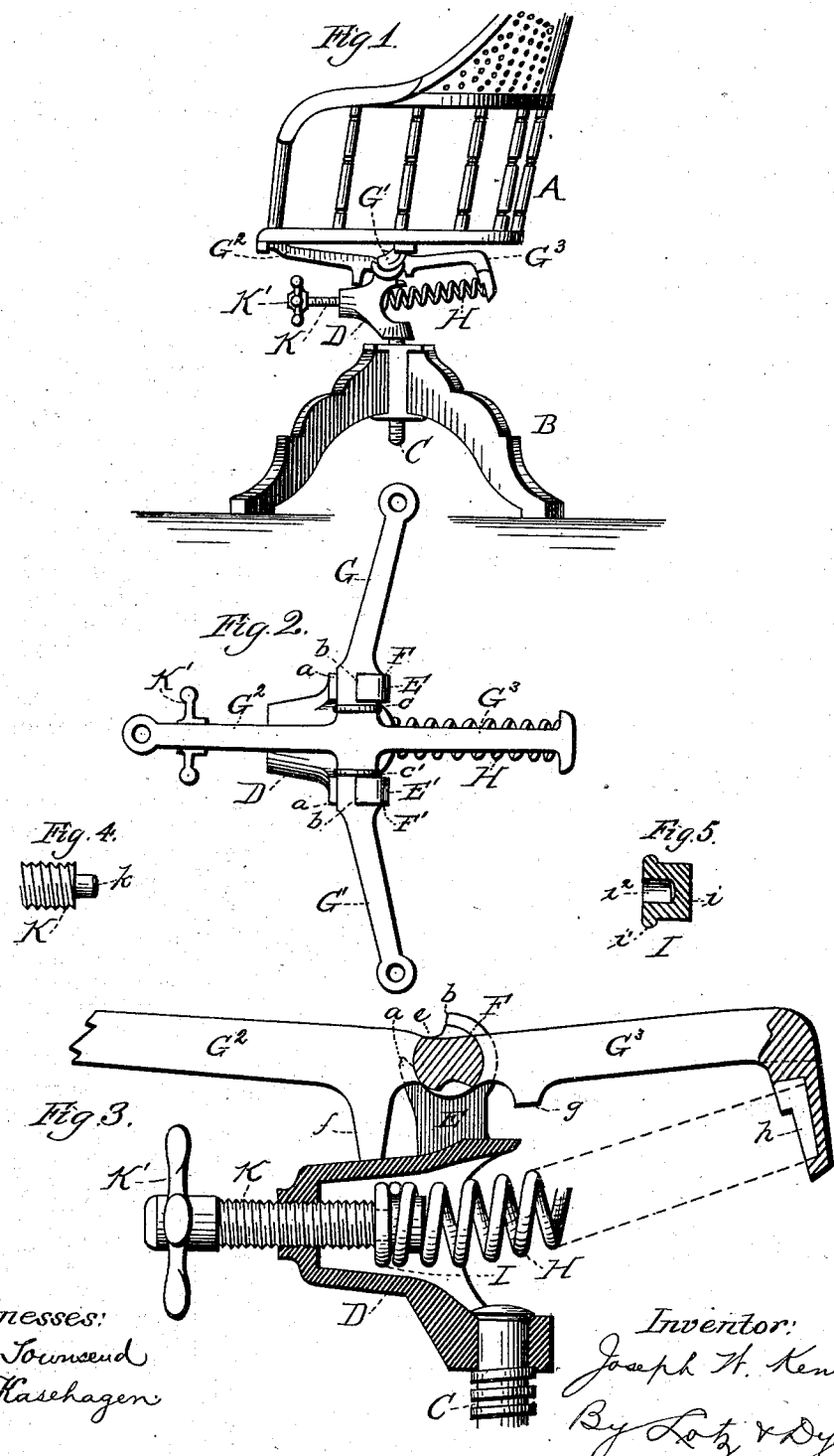

UNITED STATES PATENT OFFICE.

JOSEPH W. KENNA, OF CHICAGO, ILLINOIS.

TILTING CHAIR.

SPECIFICATION forming part of Letters Patent No. 252,225, dated January 10, 1882.

Application filed February 26, 1881. (No model.)

*To all whom it may concern:*

Be it known that I, JOSEPH W. KENNA, of Chicago, in the county of Cook and State of Illinois, have invented a certain new and useful Improvement in Tilting Chairs, of which the following is a specification.

The object I have in view is to produce a spring tilting and revolving chair for office use in which the spring can be readily given more or less tension, as desired, the working parts will be much cheaper and more efficient than in chairs of this class heretofore, and the spider can be easily detached from the elevating-screw or revolving upright, and connected therewith without removing and applying bolts or other fastenings, which is a great convenience in shipping, and enables the parts to be packed within a smaller compass and to be put together without difficulty when they have reached their destination.

My invention therein consists in the peculiar novel devices and combinations of devices employed by me to accomplish this object, as fully hereinafter explained, and pointed out by the claims.

In the accompanying drawings, forming a part hereof, Figure 1 is an elevation of the chair; Fig. 2, a top view of the spider, spring, and supporting-upright; Fig. 3, a vertical section of the last-named parts; Fig. 4, a separate view of the end of the adjusting-screw, and Fig. 5 a section of the loose guide-washer.

Like letters denote corresponding parts in all five figures.

A is the body of the chair, and B the base, which is composed as usual of three legs connected by a metal block through which turns the screw C. To the upper end of the screw C is rigidly secured a metallic upright, which is composed of a socket, D, extending from the screw C toward the front of the chair, the purpose of which will be presently explained, and two short standards, E E′, rising from the sides of such socket near the rear end thereof. The upper ends of these standards are constructed to form circular bearings F F′, which have their front sides open for about one-fourth of their circumference, the lower point, $a$, of each bearing rising on the front side to about opposite the center of the bearing, or slightly above such center, while the upper point, $b$, terminates vertically above the center of the bearing, or a little short of the same.

The spider is composed of four arms, as shown, the two side arms, G G′, and the front arm, $G^2$, being secured by screws at their outer ends to the seat-frame of the body A, while the rear arm, $G^3$, is preferably not secured to the seat-frame. The side arms, G G′, near their inner ends engage with the bearings F F′ and turn therein, forming the horizontal journals upon which the chair-body is pivoted. The side spider-arms are provided between or outside of the open bearings with shoulders $c$ $c'$, which prevent the spider from moving laterally on the supporting-upright. Where the spider-arms fit the bearings they are made circular in cross-section, as shown in Fig. 3, but for the purpose of permitting such journals to be placed in and removed from the open bearings they are cut away or grooved both on their lower and upper sides, such depressions or grooves being represented by the letters $d$ $e$. To place the journals in the open bearings it is necessary to first rest the lower grooves, $d$, of the journals on the points $a$ of the bearings. Then the chair-body is tipped back until the upper points, $b$, of the bearings enter the upper grooves, $e$, of the journals, when such journals can be pushed into the bearings. The journals, it will be seen, completely fill the bearings, rendering it impossible for them to work from place in use. Even when the chair is lifted by the body the spider will not be disconnected from the upright support, since the spring about to be described keeps the chair-body forward on the upright.

In detaching the spider from the screw and upright support (it being understood that the spring is first removed) the chair-body is thrown back until the points $b$ enter the grooves $e$. Then the chair-body is drawn forward so as to bring the points $a$ into the grooves $d$ and allow the journals to be turned out of the bearings.

The front spider-arm, $G^2$, has a downward projection, $f$, while the rear spider-arm, $G^3$, has a similar though shorter projection, $g$, which strike the upper side of the socket D and act as stops to confine the tilting movement of the chair within safe limits.

The rear stop, g, may be a screw turned down through the spider-arm G³, or any other form of adjustable or removable stop.

The rear spider-arm, G³, is turned downward at its outer end and broadened into circular shape. The inner side of such broad vertical end is formed with a circular recess, h, for receiving and holding in position the rear end of the free spiral spring H. This spiral spring at its forward end enters the socket D and receives a guide-washer, I. This guide-washer has a projection, i, which enters the spring far enough to hold it firmly, and a flange, i', which bears against the end coil of the spring. This guide-washer also has a small central socket, i², which fits on the reduced end k of the adjusting-screw K. The screw K turns centrally through the closed forward end of the socket D, and has a hand-wheel or thumb-nut, K', on its forward end, directly beneath the front of the chair-seat, by which the screw can be readily turned by a person seated in the chair. This hand-wheel is preferably cast with the screw, but it may be a separate piece secured to the screw in any suitable manner.

The reduced inner end, k, of the screw is long enough to support the guide-washer in line therewith, so as to hold the spring off from the sides of the socket D and prevent any noise when the chair is tilted back.

The spring can be easily removed from the chair by turning the screw back and then slipping the outer end of the spring out of the recess h. It is put in place by pushing its inner end into the socket D and upon the guide-washer, and then forcing its outer end into the recess h. After this is done the spring can be given any desired tension by turning forward the screw K. This tension can be varied according to circumstances or the weight of the person using the chair, and, as before stated, the screw can be conveniently turned by a person seated in the chair without the trouble of getting out of the chair and stooping down for that purpose.

The purpose of the long socket D is to provide a bearing for the adjusting-screw K in front of the elevating-screw C and to hide from sight the connection of such screw with the spring. This socket also permits considerable movement of the screw and forms a strong support for the bearing-standards E E'. In knocking down for shipment, the screw K can be wholly removed from the socket D by reason of having the guide-washer mounted loosely on its ends, and, as before explained, the spring can be removed and the spider detached from the elevating-screw C and its upright. This enables the parts to be packed for shipment in a smaller space than heretofore. The method of holding the spring is also exceedingly efficacious, besides being simple and cheap. It is held between the rear arm of the spider and the adjusting-screw without the use of connecting-rods or other like supports. The pressure in tilting the chair-body is brought directly upon the spring, and not through the intervention of joints, levers, and rods. These features make the metallic parts of my chair less expensive than those of its class heretofore.

It will be noticed that when the chair-body is in its normal position the spring is bent upwardly from the guide-washer to the spider-arm; but when the chair is tilted backward the rear spider-arm is lowered, and the spring, when compressed the most, is held on a straight line from the guide-washer I to the recess h.

The metallic parts are all constructed from cast-iron and may be made malleable or not, as desired. With good castings no fitting is required, except for the screw K.

What I claim as my invention is—

1. In a tilting chair, the combination, with the base B, the elevating-screw C, and the upright support connected with such screw and having standards E E', provided with bearings F F', open on their front sides, of the spider-arms G G', provided with round journals having bottom and top grooves or depressions, d e, substantially as described and shown.

2. In a tilting chair, the combination, with the elevating-screw, the upright support connected with such screw, and the spider pivoted on the upright support, of the adjusting-screw K, turning through such upright support, and the spiral spring H, held between the rear arm, G³, of the spider and the point of the said adjusting-screw, substantially as described and shown.

3. In a tilting chair, the combination, with the elevating-screw, of the socket D, connected with such screw, and having standards in which the spider is pivoted, the adjusting-screw K, turning through such socket, and the spiral spring H, held between the rear arm, G³, of the spider and the point of said adjusting-screw, one end of such spring entering said socket, substantially as described and shown.

4. In a tilting chair, the combination, with the upright support, of the spider pivoted on the same, the adjusting-screw K, turning through such upright support, the guide-washer I, carried by the end of the adjusting-screw, and the spiral spring H, held between such guide-washer and a downward projection on the spider, substantially as described and shown.

5. In a tilting chair, the combination, with the socket D, having standards E E', provided with open bearings F F', of the spider removably pivoted in such bearings, the removable spring H, and adjusting-screw K, substantially as described and shown.

6. In a tilting chair, the combination, with the socket D, of the spider removably pivoted thereto and having front and rear stops, f g, the spring H, and adjusting-screw K, substantially as described and shown.

JOSEPH W. KENNA.

Witnesses:
F. W. KASEHAGEN,
EMIL H. FROMMANN.